Patented Mar. 25, 1952

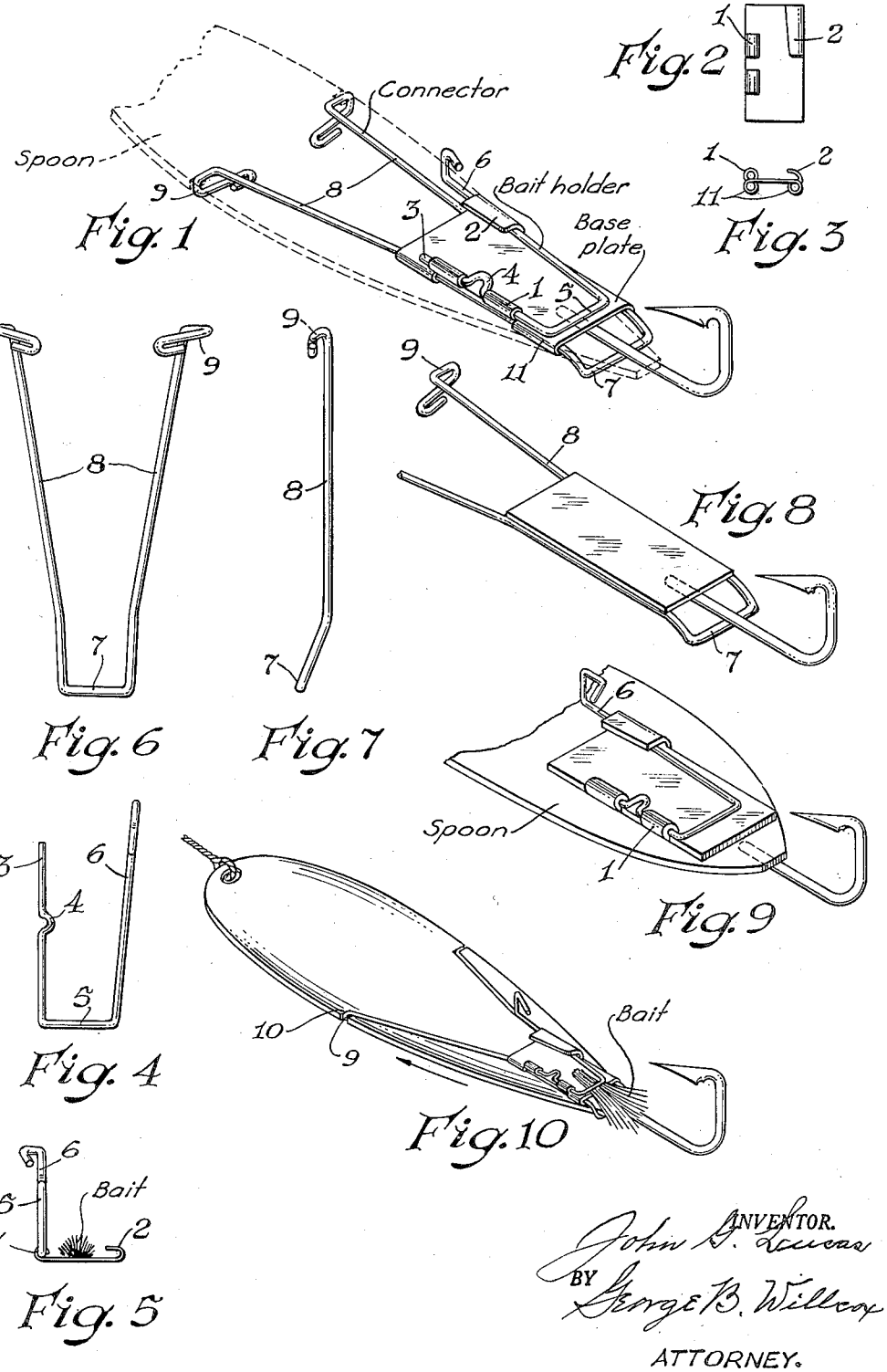

2,590,633

UNITED STATES PATENT OFFICE 2,590,633

DEVICE FOR MOUNTING AND INTERCHANGING ACCESSORIES ON A FISHING SPOON

John G. Lucas, Saginaw, Mich.

Application December 9, 1948, Serial No. 64,376

3 Claims. (Cl. 43—42.09)

This invention relates to fishing tackle, and with regard to certain specific features, to an attachment and releasing device for mounting certain accessories on a "deep wobbler" fishing spoon that operates by being pulled up slowly and then allowed to sink with wobbling and weaving action, as in fishing through ice in winter.

My improvement consists of an ingenious combination of elements in such a way as to make a useful convenient apparatus for applying, holding, or releasing various selected fishing accessories collectively or singly.

The term "attachment and releasing device" is employed to designate in general a construction comprising a base plate which is common to all embodiments, and one or more selective elements to be applied thereto, such as a fish hook, a bait-holder, and a connector for releasably holding the plate and its assortment of accessories on a spoon.

Among the objects of my invention are:

To provide a device of that kind having simple, efficient, convenient, and compact construction arranged and adapted for quickly changing accessories, or combinations of them, so as to satisfy requirements of the user while fishing;

To provide such construction so thin and flat that it can be conveniently carried in a pocket book or hat band;

To provide certain details of construction of the base plate, bait-holder, and connector, whereby their combination is simplified, affording maximum strength and stability while facilitating manufacture and assemblage of the parts, with consequent economy in commercial production of the article.

To provide such a base plate having an exposed surface area presenting a reflecting or flash lure that can be used either with or without a bait;

To provide for use on the base plate an improved safety-pin-like hinged bait gripper arranged to hold the bait in the space between the point and the shank of the fish hook and within the bend;

To provide as an integral part of the base plate a snap-action connector for quickly fixing to a spoon a unit comprising the plate and whatever assembly of accessories may be mounted thereon;

To provide means of constructing such units, as stock merchandise, by assembling on the said base plate those accessories that are desired by fishermen; also, to provide means on the base plate for readily changing such of the accessories as baits or hooks.

Other objects will be in part obvious and in part pointed out herein.

Novel elements and combinations of elements, features, or construction and arrangements of parts will be exemplified in preferred forms in the structures described and illustrated herein, and the scope of the application will be indicated in the appended claims.

In the drawings—

Fig. 1 is a view in perspective showing the top face of the preferred form of my improved attachment and release device; including the base plate, bait-holder, fish hook and resilient connector, as a unitary assembly; the relative positions of the device and a "deep wobbler" spoon to which it may be attached, being indicated by broken lines representing the outline of the spoon.

Fig. 2 is a top plan view of the base plate;

Fig. 3 is an end view of the same, showing the locations of the attaching means for the bait-holder and connector;

Fig. 4 is a plan view of the bait holder;

Fig. 5 is an end view of the base plate and bait, showing the bait-holder in open position;

Figs. 6 and 7 are, respectively, the plan view and a side view of the connector for removably securing the base plate and its attached accessories to a spoon;

Fig. 8 is a perspective view, showing a base plate and a fish hook and my snap action connector permanently secured thereto;

Fig. 9 is a fragmentary view of a conventional spoon with a fish hook permanently fixed at its end, and a base plate permanently fixed to the spoon and carrying a bait-holder; and Fig. 10 is a perspective view of the concave face of a spoon that carries the releasable assembly shown in Fig. 1, showing a bait clamped in position for use, and showing the means for snap engagement of the connector and spoon.

My invention is capable of embodiment in several forms and combinations.

Fig. 1 may be considered as representing a typical embodiment of the inventive subject-matter: A base plate is secured detachably to a conventional spoon. A fish hook is fixed to the base plate and projects longitudinally toward the small pointed end of the spoon. A hinged safety-pin-type bait-holder is operatively mounted on the upper face of the plate. A resilient wire snap-action connector is fixed to the under face of the plate, being adapted to releasably secure the plate and its associated parts as a unit to a conventional "deep wobbler" spoon.

Various lesser combinations of the parts alluded to can be made to suit a wide range of alternative assemblies for ice fishing, as will be apparent upon reference to typical examples illustrated in Figs. 8, 9, 10.

In Fig. 8 the plate, hook and connector assembly resembles the structure of Fig. 1 without the bait-holder. Here the entire face of the plate is unobstructed. It is made shiny to provide a flashing or light-reflecting lure element. The connector structure is in this instance secured permanently as by soldering, to the under side of the base plate. The arrangement, Fig. 8, allows the base plate, hook, and connector to be detached as a unit from the spoon. They can all be replaced on the same spoon by an alternative assembly on whose base plate a hook of different size or design has been mounted.

In another typical modified embodiment, Fig. 9, the fish hook is permanently fixed to the narrow end or point portion of the spoon, instead of being mounted on the base plate as in Fig. 1. Also, in the Fig. 9 modification, the base plate itself is permanently fixed to the top concave surface of the spoon, as by brazing. The hinged bait-holder is mounted on the exposed upper surface of the base plate, enabling various baits to be interchanged without removing either the hook or the base plate from the spoon. In Fig. 9 the bait-holder covers part of the area of the plate, distinguished from Fig. 8. The exposed parts of the plate serve as flashing lure elements of less total reflecting area than in Fig. 8.

Numeral 1 designates hinge knuckles spaced apart along one edge and on the top face of the plate. At the other edge is a clip such as lug or finger 2. The hinge knuckles and clip constitute the mounting for the bait holder. The exposed top surface of the plate, as noted above, is preferably made of reflecting material to serve as a flash lure.

The bait-holder, shown in detail in Fig. 4, is made of a length of spring wire bent to form a pintle portion 3, a lateral extension 4, a gripper bar 5, and a resilient latch arm 6. Pintle 3 is journaled in the hinge knuckles 1, and intermediate the knuckles is the lateral extension 4 to keep the pintle from moving endwise.

The part 5 presents a bait gripper bar, by which a bait, Fig. 10, can be clamped to the top face of the plate, near its end.

The part 6 presents a resilient latch arm portion arranged for engagement with the clip 2 in the manner of a safety pin.

The connector, shown in detail in Figs. 6 and 7, is a U-shaped hair-pin-like structure made of slender resilient wire. It is attached to the under side of the base plate, as shown in Figs. 1 and 8 and constitutes my preferred means for releasably fastening the base plate to a fishing spoon. At one end of the connector a loop 7 is formed that extends beyond the end of the base that is nearest the bait gripper bar 5. The loop is bent downwardly at an incline from the plate to provide a stirrup or holder for gripping the small pointed end of the spoon.

A pair of spring arms 8, 8 extends beyond the other end of the base plate as shown in Fig. 1. The arms diverge outwardly and at their free ends are provided with detents or hooks 9 formed by bending the wire as shown in Figs. 6 and 7. The detents 9 are shaped so as to engage the two side margins of the spoon and be guided by them when the assembled device is being slid into place, over the small pointed end of the fishing spoon, in the direction of the arrow, Fig. 10. The detents 9 automatically lock themselves to suitable abutments or notches 10 formed at the edges of the spoon for causing the connector to releasably anchor the base plate and bait-holder to the spoon.

Number 11 designates clincher tabs on the under side of the base plate for the purpose of fastening the connector to the plate. By means of this connector the base plate, the fish hook and the bait may all be removed simultaneously from the spoon by a single snap-action operation at 10 and all may be replaced quickly by other base plates equipped with prearranged substitute parts.

The plate slips over the small end portion of the spoon on its concave side. The detents 9 on the spring arms of the connector slide along the diverging side margins of the spoon until the loop 7 makes a close fit around the end of the spoon. Thereupon the detents 9 snap into the notches 10. The plate is thus secured at the small end and at both edges of the spoon releasably but firmly.

Fish hook retaining devices and snap hook links for fish lines have been used, but have not proved entirely satisfactory in the following respects:

They have usually been made in the form of wire clips or safety-pin type links for connecting fish hooks to lines. The hook retaining clip made of wire required too many motions for attaching or detaching the hook from the spoon, and the clips themselves occupied too much space and presented obstructions along the base of the spoon in order to hold the hook shank to the spoon by spring action.

The snap hook links referred to, while adapted for the purpose of connecting the hook to the line, were not adapted to releasably secure various baits to a base plate mounted on the spoon, either permanently or removably, as in my device herein described.

Having thus described my invention, what I claim and desire to secure by Letters Patent is:

1. Attachment and releasing means of the class described, comprising a base plate so constructed and arranged as to facilitate its mounting on the concave face of a tapered fishing spoon, adjacent the small end thereof; a fish hook fixed to said plate and extending beyond an end thereof; and a connector fixed to the under side of said base plate and presenting a loop portion extending beyond the end of said plate and arranged so as to provide a stirrup adapted to engage and hold the small end of the spoon; said connector having a pair of divergent spring arms extending beyond the other end of the plate; said arms provided at their free ends with detent members constructed to engage the side margins of the spoon and to lock therewith upon the said engagement of the stirrup and the small end of the spoon.

2. Attachment and releasing means of the class described, comprising a base plate constructed and arranged so as to facilitate its mounting on the concave face of a tapered fishing spoon, adjacent the small end thereof; the exposed top surface of the plate being made of reflecting material to provide a flash lure; and a connector fixed to the underside of said base plate and arranged to provide a stirrup to engage and hold the said small end of the spoon; said connector having a pair of divergent spring arms extending beyond the other end of the plate and provided at their free ends with means for releasably locking the arms to the side margins of the spoon upon said engagement of the stirrup and the small end of the spoon.

3. In a device for mounting and interchanging accessories on a fishing spoon, a connector made of slender resilient wire bent to U-shape with two divergent arms and having at its closed end a loop bent at an incline from the plane of the arms and formed to receive therein an end portion of the spoon; said arms provided at their free ends with detents releasably engageable with the two side margins of a fishing spoon and slidingly movable lengthwise thereof; said margins of said spoon being formed with notches to receive and releasably hold said detents.

JOHN G. LUCAS.

REFERENCES CITED

The following references are of record in the file of this patent:

UNITED STATES PATENTS

| Number | Name | Date |
| --- | --- | --- |
| 462,071 | Abbey | Oct. 27, 1891 |
| 821,142 | Wagoner | May 22, 1906 |
| 888,935 | Sams | May 26, 1908 |
| 895,324 | Albrecht | Aug. 4, 1908 |
| 1,264,626 | Foss | Apr. 30, 1918 |
| 1,978,875 | Wright | Oct. 30, 1934 |
| 2,167,163 | Toepper | July 25, 1939 |
| 2,214,409 | Eaby | Sept. 10, 1940 |
| 2,319,096 | Wood | May 11, 1943 |
| 2,423,615 | Pecher | July 8, 1947 |